United States Patent [19]
Lambert, Sr. et al.

[11] Patent Number: 5,118,451
[45] Date of Patent: Jun. 2, 1992

[54] FUEL VAPORIZATION DEVICE

[76] Inventors: Raymond A. Lambert, Sr., 1769 Sycamore St. NW., Washington, D.C. 20012; Isacco El-Am, 111-44 166th St., Jamaica, N.Y. 11433

[21] Appl. No.: 793,546

[22] Filed: Nov. 18, 1991

Related U.S. Application Data

[63] Continuation-in-part of Ser. No. 647,976, Jan. 30, 1991.

[51] Int. Cl.⁵ ............................................. F02M 31/00
[52] U.S. Cl. ................................... 261/144; 123/557; 165/154
[58] Field of Search .................. 261/144; 165/52, 154; 123/557

[56] References Cited

U.S. PATENT DOCUMENTS

| | | | |
|---|---|---|---|
| 4,197,819 | 4/1980 | Mahoney et al. | 123/557 |
| 4,218,999 | 8/1980 | Schearer | 123/557 |
| 4,306,617 | 12/1981 | Lancaster | 123/557 |
| 4,325,345 | 4/1982 | Wilkinson et al. | 123/557 |
| 4,398,523 | 8/1983 | Henson | 123/557 |
| 4,469,075 | 9/1984 | Jackson et al. | 123/557 |
| 4,527,533 | 7/1985 | Laramee | 123/557 |
| 4,784,092 | 11/1988 | Pitti | 123/557 |
| 4,858,584 | 8/1989 | Bridgeman | 123/557 |

*Primary Examiner*—Tim Miles
*Attorney, Agent, or Firm*—Richard C. Litman

[57] ABSTRACT

A fuel vaporization device utilized in conjunction with an internal combustion engine which is serviced by a fluid circulating cooling system and a fuel supply system. The vaporization device comprises a compact chamber sealed by two end walls having inlet and outlet ports to allow straight-line flow of the engine cooling medium through a centrally positioned, fluid-tight heater tube. Fuel inlet and outlet ports are provided atop the chamber and a plurality of baffle members are systematically arranged along the heater tube to inhibit flow of the liquid fuel through the chamber and permit escape of fuel vapor through the outlet port. As fuel passes through the compact chamber, heat is exchanged from the cooling medium in the tube to the fuel in the chamber to cause vaporization thereof prior to carburetion or injection in an engine of a motorized vehicle. Use of the device reduces air pollution and improves fuel economy through more efficient fuel consumption.

6 Claims, 2 Drawing Sheets

FUEL VAPORIZATION DEVICE

CROSS-REFERENCE TO RELATED APPLICATION

This application is a continuation-in-part of U.S. patent application Ser. No. 07/647,976 filed on Jan. 30, 1991.

BACKGROUND OF THE INVENTION

1. Field of the Invention

The present invention relates to a fuel vaporization device for use with an internal combustion engine to enhance engine performance and minimize fuel consumption. More particularly, the invention pertains to an auxiliary heating unit through which liquid fuel is passed in heat exchanging relationship with radiator fluid to vaporize the fuel prior to admission into a carburetor or fuel injector.

2. Description of the Prior Art

It is generally known in the art that preheating gasoline and other liquid fuels prior to carburetion or injection in an engine of a motorized vehicle can significantly improve engine operation and reduce exhaust pollutants. Also, since less energy is used to heat liquid fuels to vaporization temperatures in the combustion chamber of the engine, preheating promotes greater combustion efficiency and fuel economy. The prior art has provided various devices to preheat the fuel before combustion through the use of the heated medium from the coolant system, such as shown in U.S. Pat. No. 3,253,647 to Deshaies. This patent discloses a fuel preheater in which fuel passes through a spiral coil within a cylindrical tank adapted to be filled with radiator heating fluid. The disclosed device further includes a cooling air tube extending through the center of the spiral coil so as to equalize the temperature between the coil spires in order to prevent overheating of the fuel. However, it is appears that this patented heat exchanger is of the type that very complicated in construction and would be subject to malfunction due to temperature distribution problems associated with vaporization and condensation of the fuel. It is a particular disadvantage of this construction that the fuel does not remain in a vaporized state and condensation may occur on the interior walls of the conduit leading to the carburetor. Examples of other prior art devices which attempt to improve vaporization by preheating liquid fuels utilizing a heat exchanging mechanism of the aforementioned type are disclosed in U.S. Pat. Nos. 3,110,296 to Lundi; 4,003,356 to Naylor; 4,326,491 to Burchett and 4,858,584 to Bridgeman. Although such devices may improve fuel economy to some extent, they lack the benefits of the present invention.

SUMMARY OF THE INVENTION

It is, accordingly, a primary object of the present invention is to provide an improved fuel vaporization device which overcomes or substantially ameliorates the above-mentioned disadvantages associated with prior devices of this type. It is a further object of the invention to provide such a fuel vaporizing device which maximizes the efficiency and performance of an internal combustion engine. It is among the additional objects of the present invention to provide a fuel vaporizer unit which is relatively uncomplicated in construction and therefore economical to manufacture, install and maintain. In this regard, the present auxiliary vaporizer is sufficiently compact in size to be readily installable within available space of vehicles of many different makes and models and is capable of being utilized with existing fuel an coolant handling components without substantial modifications. These and other objects are accomplished in accordance with the present invention which provides a fuel vaporization device utilized in conjunction with an internal combustion engine which includes a circulating fluid cooling system and a fuel supply system, said device comprising an outer housing defining a compact, elongated chamber sealed by two end walls having valve controlled inlet means and outlet means to allow circulation of the engine cooling medium through a centrally positioned heater tube. Valve controlled fuel inlet port and outlet port are provided in the outer housing and a plurality of baffle members are secured to the exterior surface of the heater tube to inhibit flow of the liquid fuel through the chamber and permit escape of fuel vapor through the outlet port. As fuel passes through the compact chamber, heat is exchanged from the cooling medium in the tube to the fuel in the chamber to cause vaporization thereof. In accordance with a significant feature of the invention, the valve controlled fuel inlet port and outlet port extend perpendicular through the outer housing and fuel is passed through the baffled chamber in counter flow to hot coolant passing through the central heater tube. In this manner, the fuel follows a sinuous flow path whereby liquid fuel collects about the central tube where heat is absorbed by the fuel and is fully vaporized. The fully vaporized fuel then rises to the upper portion of the chamber until it is drawn into the carburetor, or the fuel injectors, by a vacuum pressure wherein it is mixed with air to provide a fuel-air mixture for combustion in an engine. The foregoing and other features, advantages and objects of the invention may be more fully appreciated by reference to the following detailed description taken in connection with the accompanying drawings, which illustrate exemplary embodiments of the present invention.

DETAILED DESCRIPTION OF THE PREFERRED EMBODIMENTS

Figure 1:
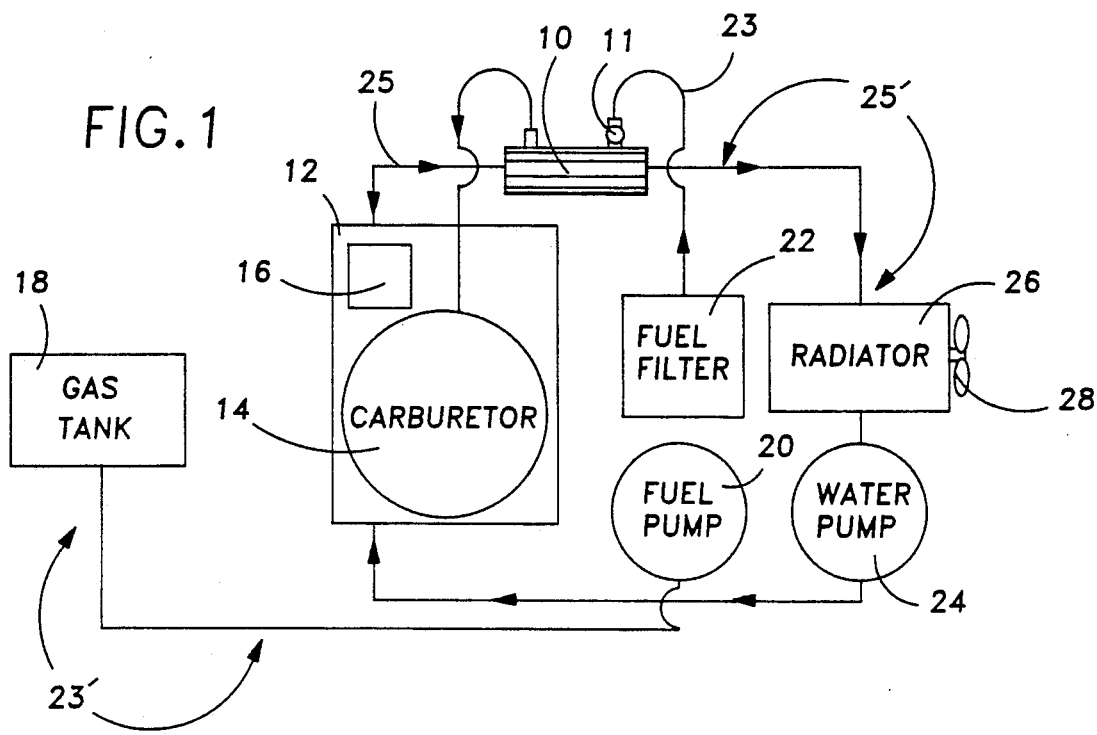
FIG. 1 is a schematic view of an internal combustion engine having a fuel supply system and cooling system for a motorized vehicle in association with a fuel vaporization device according to the present invention.
Figure 2:
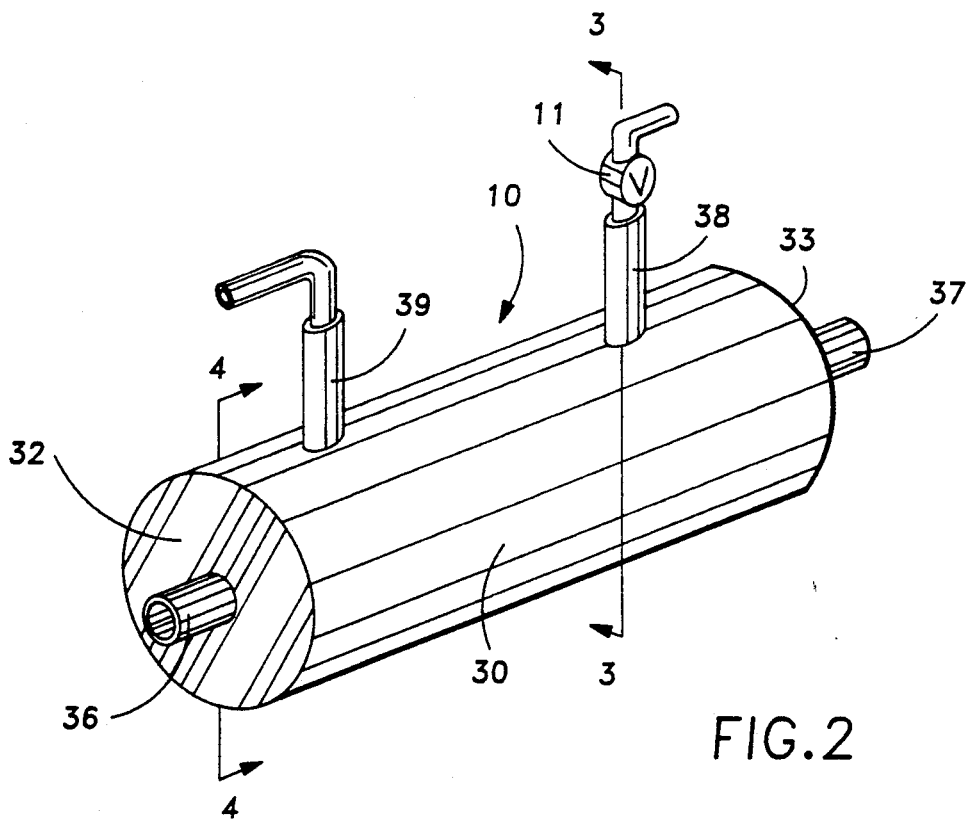
FIG. 2 is a perspective view of the fuel vaporization device in accordance with the invention.
Figure 3:
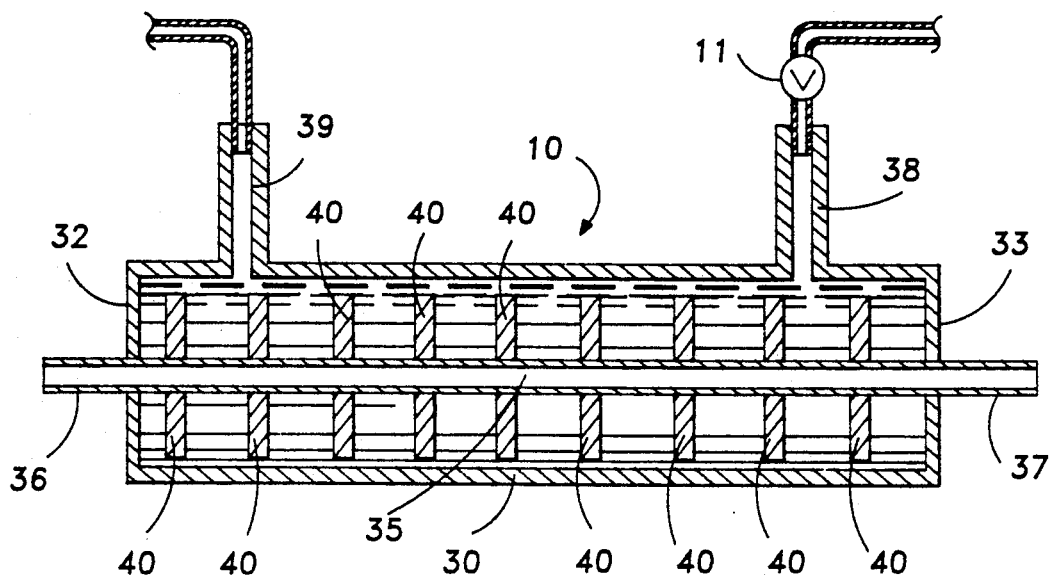
FIG. 3 is a cross-sectional view of the fuel vaporization device of FIG. 2 taken along line 4—4.

Referring to the accompanying drawings and particular to FIG. 1, the improved fuel vaporization device of this invention, generally indicated as 10, is used in combination with an internal combustion engine schematically illustrated as 12 which is serviced by a fuel supply system 23' and a cooling system 25'. Engine 12 for a typical motor vehicle has an intake manifold (not shown), the usual carburetor or fuel injector 14 and air filter housing 16 which contains a suitable air filter (not shown). Other engine components which comprise the fuel supply system 23' are a fuel storage tank 18, fuel pump 20 and fuel filter 22. The cooling system for the engine is illustratively of conventional arrangement and includes such accessories as a water pump 24, a radiator 26 and a fan 28. Fuel vaporizer 10 is installed in interrupting relationship to both the fuel supply system via fuel line 23 and the cooling system via a hot coolant line 25 to accomplish heat transfer from heated coolant to vapor fuel flowing to the engine for combustion. Referring to FIGS. 2 and 3, there is shown in greater detail the fuel vaporization unit 10 having a cylindrical chamber 30 bounded by opposite circular end walls 32 and 33, a fluid-tight heater tube 35 concentrically housed within the chamber 30 with fluid inlet 36 and fluid outlet 37 extending through the endwalls, an external valve controlled fuel inlet port 38 and an external vapor discharge port 39 vertically extending from atop the chamber 30 adjacent opposite ends thereof, the valve controlled fuel inlet port 38 is connected to a adjustable valve 11 and a plurality of annular baffle plates 40 arranged interiorly of the end walls and securely spaced along the outer surface of the heater tube 10. The interior surface of the fluid-tight tube 35 is in communication with heated coolant flowing from the engine 12 to-radiator 26 and is in fluid isolation from the fuel flowing throughout the remainder of interior of the chamber, so as to provide two opposite flow paths in heat exchanging relationship. Fluid-tight tube 35 and integrally formed fluid inlet 36 and fluid outlet 37 are made of heat-conductive and corrosion resistant metallic material, such as copper tubing or the like. The optimum diameter of heater tube 35 was calculated based on the overall dimensions of the present vaporization device to promote both efficiency and the rate of heat exchange. Thus, the ratio of the inner diameters of chamber 30 and the heater tube 35, is preferably about 3 and the ratio of the length of the chamber to its inner diameter, is preferably about 4. The exterior dimensions of the vaporization device of the present invention may vary to conveniently fit into available space under of hood of various vehicles.

Fuel inlet port 38 and vapor discharge port 39 are shown positioned atop chamber 30. These ports vertically extend in an airtight manner through the uppermost wall of the chamber 30 for communication with the fuel line 23. The fuel inlet port 38 is connected to a n adjustable valve 11. The valve 11 is then connected to the fuel line 23. The function of the valve 11 is to allow for the most efficient use of the fuel by controlling the flow. The valve 11 allows enough fuel through the chamber 30 to feed the engine 12 when the engine is cold. The foregoing components are preferably formed of copper or similar material which is durable and which constitutes a relatively good conductor of heat.

Figure 4:
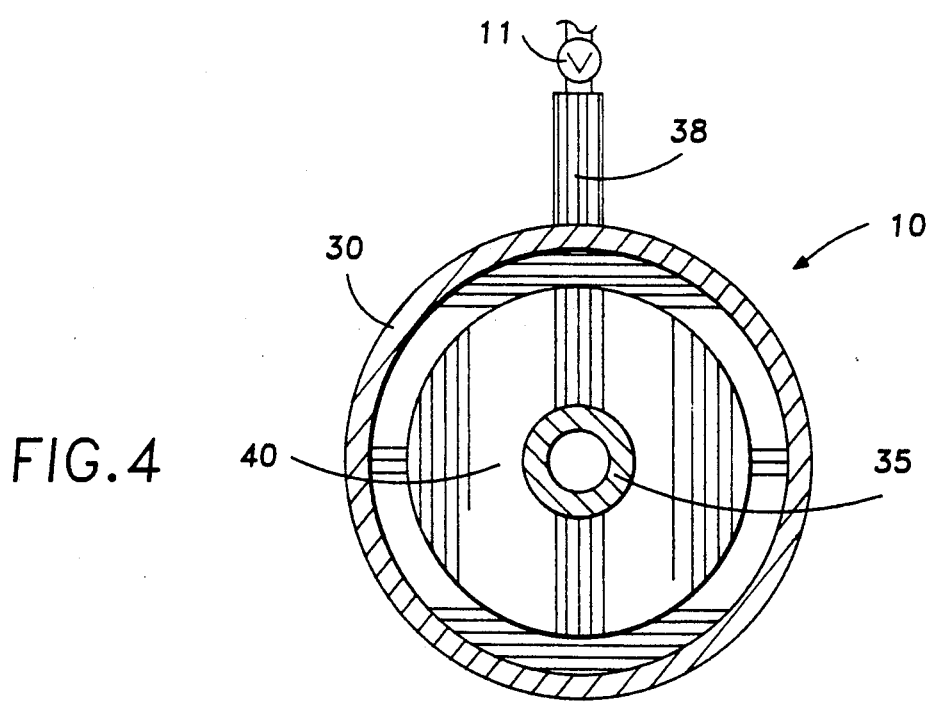
FIG. 4 is a sectional view of the fuel vaporization device of FIG. 2 taken along line 3—3.

The interior of chamber 30 is provided with a plurality of annular baffle plates 40 which are substantially equally spaced apart and concentrically arranged along the outer surface of heater tube 35. These baffle plates, usually formed of heat conductive metallic material, are secured to tube 35 as by welding and terminate in spaced relation to the interior walls of chamber 30 to form passages which permit escape of fuel vapor. Baffle plates 40 are preferably imperforate as shown in FIG. 4 so as to define an intricate flow path for the fuel-vapor mixture as it progresses towards vapor discharge port 39. The fuel enters chamber 30 through inlet port 38, via the adjustable valve 11, as a liquid and in its progressive movement will be directed by baffle plates 40 toward heater tube 35. It is here that the liquid fuel absorbs heat so as to vaporize and then rises to the top of the chamber. The unvaporized portion of fuel is continuously circulated within a plurality of spaces between the baffles without causing overheating of the fuel until vaporization occurs. Only fully vaporized, air-free fuel is permitted to pass through discharge port 39 and the fuel line leading to the carburetor, or injector, when the engine is warm.

The vaporized fuel and air are then mixed in the carburetor. A usual carburetor contains floats that shut off the liquid fuel when a certain level is reached. However the present invention allows the vaporized fuel to pass through the carburetor for several reasons. First, the bowl of the carburetor never fills with fuel causing the float to remain open. Second a pressure created by the vaporized fuel, in the chamber, pushes the vaporized fuel into and through the carburetor. Lastly, the vacuum created by the engine, pulls in the vaporized fuel. In reference to a fuel injector, which are normally controlled by electronic circuits, the circuit is re-programmed to allow for a change from fluid fuel to a vapor fuel. The injector will then allow the vaporized fuel to pass therethrough. When the engine is cold, both the carburetor and the fuel injector operate in the normal manner. Unvaporized fuel passes through chamber 30 and feeds the carburetor, or the injector, in the normal manner.

Referring to FIG. it will be observed that the fuel vaporization device 10 is disposed in a generally horizontal position and may be attached to any available portion of the internal combustion engine adjacent the carburetor, or injector, by any suitable fastening means (not shown). As generally illustrated diagrammatically, it is convenient to tap heated fluid which normally flows from the engine block to the top of the radiator when the engine thermostat is in the open position. Heater line 25 connects to fluid inlet 36 of the chamber 30 and a coolant return line leads from the outlet 37 to the suction side of the radiator pump for return of hot coolant to the bottom of the radiator or engine. Fluid inlet 36 and fluid outlet 37 may be provided with a plurality of annular barbs (not shown) adjacent each end thereof which are adapted to telescopingly engage the inner surface of the heater line. The heater line preferable comprises a rubber hose and the like of suitable diameter which may be secured to inlet 36 and outlet 37 by any suitable type of clamping means (not shown). The heater hose may be connected by T-fittings (not shown) to respective sections of the radiator hose. By this arrangement hot fluid from the engine circulating cooling system is caused to pass horizontally into and out of heater tube 35 in a straight line flow.

It is apparent from the schematic drawing that existing fuel and cooling systems of internal combustion engines can be readily modified to accommodate the present vaporization device. Alternatively, the installation of the present device in new equipment would entail little expense and would not significantly change the volumetric space normally available in various engine compartments. The two fuel ports, indicated at 38 and 39, constitute part of the fuel supply system and can easily be installed in virtually any type motor vehicle by any suitable connecting means. It will be noted that the device of the present invention constitutes a closed system. For instance, from the fuel storage tank to discharge port 39, air is prevented from coming into contact with the fuel to avoid accidental combustion and premature condensation.

For most efficient functioning, the device of the present invention is preferably mounted in as close proximity to the carburetor, or injector as is feasible. It has been found that the temperature and flow control systems for most vehicles is sufficient to control the vaporization temperature of the fuel when the present device is utilized. Thus, there is an active cooperation between the controls comprising the engine thermostat and both the fuel pump and coolant pump so as to produce sufficient heated coolant to the heating tube of the present device to cause vaporization of the fuel in the chamber. The temperature remains relatively constant within the chamber during normal operation of the engine, including stopping or during idle, since the existing controls are sufficient to compensate for changes in ambient temperature and/or fuel consumption. In general, as the engine increases speed, the fuel pump also increases the flow of fuel to the carburetor for combustion in the engine. Therefore, more fuel passes through the present vaporizer and proportionally greater heat is required to provide a constant vaporization temperature of the fuel exiting the discharge port. Simultaneously, the coolant pump and heated coolant passing through the fluid circulating system increases substantially in proportion to the increased speed of the engine. Thus, provided the engine has reached a warm-up state, the flow of hot coolant entering the heater tube increases to exchange heat and maintain relatively constant fuel vaporization temperature. Similar effects occur when the engine slows down, that is, the fuel consumption and the flow of heated coolant entering the vaporization device decreases. From the foregoing it will be appreciated that the device of the present invention provides a simple, compact, inexpensive and reliable vaporizing device for use with internal combustion engines which significantly improves engine performance, power and fuel economy, as well as reduces air pollution. Also form the foregoing, if the coolant fails, the engine is still able to operate in the normal manner. Thus, testing of vehicles for performance utilizing the present device demonstrated improved mileage for a given amount of fuel in comparison to the same vehicle without the device under substantially equivalent driving conditions. It is to be understood that there may be made various changes and modifications of the representative embodiments herein chosen for purposes of illustration without departing from the spirit and scope of the invention. Accordingly, the foregoing illustrations are not to be interpreted as restrictive of the invention beyond that necessitated by the following claims.

We claim:

1. A fuel vaporization device for use with an internal combustion engine having a circulating fluid cooling system and a fuel supply system, said vaporization device comprising:
   an outer housing defining an elongated chamber sealed by two end walls;
   a fluid-tight heater tube positioned along a longitudinal axis of said elongated chamber, said heater tube extending substantially the entire length of the chamber and through said end walls to integrally form a fluid inlet and a fluid outlet;
   a fuel inlet port and a fuel discharge port vertically extending from atop said elongated chamber adjacent opposite ends thereof;
   adjustable valve means being connected to said fuel inlet port for controlling the flow of fuel being supplied to said fuel inlet port;
   a plurality of baffle plates disposed interiorly of said chamber and concentrically arranged along said heater tube;
   and connecting means communicating said vaporization device with said circulating fluid cooling system and said fuel supply system.

2. The vaporization device according to claim 1 wherein said elongated chamber is cylindrical with circular end walls and said fluid-tight heater tube is concentrically housed within the cylindrical chamber.

3. The vaporization device according to claim 2 wherein the ratio of the inner diameter of said cylindrical chamber to the inner diameter of said heater tube is about 3.

4. The vaporization device according to claim 3 wherein the ratio of the length of said cylindrical chamber to its inner diameter is about 4.

5. The vaporization device according-to claim 1 wherein said plurality of baffle plates are secured to said heater tube and terminate in spaced relation to the interior walls of said elongated chamber.

6. The vaporization device according to claim 5 wherein said baffle plates are imperforate.

* * * * *